(12) United States Patent
Hatasaki

(10) Patent No.: US 10,599,530 B2
(45) Date of Patent: Mar. 24, 2020

(54) METHOD AND APPARATUS FOR RECOVERING IN-MEMORY DATA PROCESSING SYSTEM

(71) Applicant: Hitachi, Ltd., Chiyoda-ku, Tokyo (JP)

(72) Inventor: Keisuke Hatasaki, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 154 days.

(21) Appl. No.: 15/755,268

(22) PCT Filed: Nov. 4, 2015

(86) PCT No.: PCT/US2015/059073
§ 371 (c)(1),
(2) Date: Feb. 26, 2018

(87) PCT Pub. No.: WO2017/078707
PCT Pub. Date: May 11, 2017

(65) Prior Publication Data
US 2018/0246788 A1  Aug. 30, 2018

(51) Int. Cl.
*G06F 11/00* (2006.01)
*G06F 11/14* (2006.01)
*G06F 16/11* (2019.01)

(52) U.S. Cl.
CPC ...... *G06F 11/1469* (2013.01); *G06F 11/1451* (2013.01); *G06F 16/128* (2019.01); *G06F 2201/82* (2013.01); *G06F 2201/84* (2013.01)

(58) Field of Classification Search
CPC ............ G06F 11/1451; G06F 11/1469; G06F 11/1471; G06F 11/1446; G06F 11/1448; G06F 11/1458; G06F 2201/82; G06F 2201/84
See application file for complete search history.

(56) References Cited

U.S. PATENT DOCUMENTS

| | | | | |
|---|---|---|---|---|
| 8,131,962 | B2* | 3/2012 | Eguchi | G06F 11/1471 711/100 |
| 9,600,377 | B1* | 3/2017 | Cohen | G06F 11/1469 |
| 2004/0268067 | A1* | 12/2004 | Yamagami | G06F 11/1471 711/159 |
| 2005/0028022 | A1* | 2/2005 | Amano | G06F 11/1471 714/2 |
| 2007/0185923 | A1* | 8/2007 | Nishikawa | G06F 11/1471 |

(Continued)

FOREIGN PATENT DOCUMENTS

JP  4839091 B2  10/2011

*Primary Examiner* — Marc Duncan
(74) *Attorney, Agent, or Firm* — Procopio, Cory, Hargreaves & Savitch LLP

(57) ABSTRACT

Example implementations involve a plurality of servers, network, and storage systems, wherein some of the servers may execute data programs and store primary data in the memory of the servers. Some of the servers may also execute a standby data program. Storage devices may provide for a snapshot volume, a log volume, and a recovery volume, and executes a recovery program to store a recovery image into the recovery volume from the data of the snapshot volume and the log volume. On failure of the server, the standby data program loads the recovery image of the recovery volume, which can reduce the time to commit logs to the snapshot image.

15 Claims, 16 Drawing Sheets

(56) References Cited

U.S. PATENT DOCUMENTS

| | | | | |
|---|---|---|---|---|
| 2007/0294568 A1* | 12/2007 | Kanda | ................ | G06F 11/1451 |
| | | | | 714/6.12 |
| 2008/0010422 A1* | 1/2008 | Suzuki | ................ | G06F 11/1471 |
| | | | | 711/162 |
| 2008/0201391 A1* | 8/2008 | Arakawa | ............. | G06F 11/1471 |
| 2009/0024871 A1* | 1/2009 | Emaru | ................ | G06F 11/0727 |
| | | | | 714/6.12 |

* cited by examiner

| Volume ID 1511 | Host ID 1512 | Host Volume ID 1513 | Capacity 1514 | Device 1515 | Data Protection Mode 1516 | Diff Volume Information 1517 |
|---|---|---|---|---|---|---|
| 1 | Sv1, Recovery1 | 1 | 1.2TB | Dev1,2,3,4,5 | RAID5 | N/A |
| 2 | Sv1, Recovery1 | 2 | 300TB | Dev1,2,3,4,5 | RAID5 | N/A |
| 3 | Sv2, Recovery2 | 1 | 3T | Dev6,7 | RAID5 | N/A |
| 4 | Recovery1 | 1 | 1.2TB | | RAID5 | 1 |
| .. | .. | .. | .. | .. | .. | .. |

FIG. 3

| Host ID 1521 | Volume ID 1522 | Purpose 1523 | Recovery Volume ID 1524 |
|---|---|---|---|
| SV1 | 1 | Snapshot | 4 |
| SV1 | 2 | Log | N/A |
| SV2 | 3 | Snapshot | 8 |
| .. | .. | .. | .. |

FIG. 4

| Host ID | Log Volume ID | Data Program | Applied Log ID |
|---|---|---|---|
| SV1 | 2 | DBxx | 1003 |
| SV2 | 12 | DByy | 55124 |
| .. | .. | .. | .. |

| Log ID 801 | Transaction ID 802 | Object 803 | Value before/after update 804 | Commit Flag 805 |
|---|---|---|---|---|
| 1001 | 100 | Xxx | Aaa/111 | X |
| 1002 | 100 | Yyy | Bbb/222 | X |
| 1003 | 101 | Zzz | Ccc/333 | X |
| 1004 | 101 | Xyz | Ddd/444 | |
| 1005 | 101 | yxz | Eee/555 | |
| .. | .. | .. | .. | .. |

FIG. 8

| Host ID | Log Volume ID | Data Program | Applied Log ID | Priority |
|---|---|---|---|---|
| SV1 | 2 | DBxx | 1003 | 100 |
| SV2 | 12 | DByy | 55124 | 30 |
| .. | .. | .. | .. | .. |

METHOD AND APPARATUS FOR RECOVERING IN-MEMORY DATA PROCESSING SYSTEM

BACKGROUND

Field

The present disclosure relates generally to storage systems, and more specifically, to recovery processes for in-memory data processing systems.

Related Art

In related art implementations, there are storage architectures involving in-memory computing in the server. In-memory computing utilizes localized resources, such as server random access memory (RAM) to load application to conduct data processing. In-memory computing is utilized in the related art because the memory capacity for each server has become larger, and also includes larger and lower latency non-volatile memory, which allows for processing within the server instead of the storage system.

In cases of a failure in the server, the data stored in-memory may be incorrect because of hardware problems, and also external access to the memory of the server externally may become difficult. In the related art, there are implementations to solve for such failure. In one related art implementation, there is a replication of memory in multiple servers. In another related art implementation, there is a transaction log and snapshot image stored in a shared storage provided by a storage system.

SUMMARY

In related art implementations involving the replication of memory over multiple servers, redundant memory area is needed, wherein the efficiency of memory usage may be reduced. Further, in related art implementations involving transaction logs and snapshot images, there may be excessive recovery time in applying the log to the snapshot image.

Example implementations are directed to methods and apparatuses for recovery in-memory system which may achieve higher memory efficiency and shorter recovery time in applying the log to the snapshot image. Example implementations are directed to the reduction of recovery time and snapshot writing overhead to creating the recovery image within the shared storage.

Aspects of the present disclosure may include a storage system configured to provide one or more snapshot volumes for one or more servers, each of the one or more servers configured to conduct data processing and store the most recent data of the in-memory data process. The storage system may include one or more storage devices configured to provide the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers; a memory configured to store information associating the one or more snapshot volumes to the one or more recovery volumes; and a processor, configured to process a selected log volume from the one or more log volumes to update an associated recovery volume of the one or more recovery volumes associated with the selected log volume with data from an associated snapshot volume of the one or more snapshot volumes associated with the selected log volume.

Aspects of the present disclosure may further include a method for providing one or more snapshot volumes for one or more servers, each of the one or more servers configured to conduct data processing and store the most recent data for an in-memory data process. The method can include providing, in a storage system, the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers; managing information associating the one or more snapshot volumes to the one or more recovery volumes; and processing a selected log volume from the one or more log volumes to update an associate recovery volume of the one or more recovery volumes associated with the selected log volume with data from an associated snapshot volume of the one or more snapshot volumes associated with the selected log volume.

Aspects of the present disclosure may further include a computer program for providing one or more snapshot volumes for one or more servers, each of the one or more servers configured to conduct data processing and store the most recent data of an in-memory data process. The computer programming can have instructions which include providing, in a storage system, the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers; managing information associating the one or more snapshot volumes to the one or more recovery volumes; and processing a selected log volume from the one or more log volumes to update an associate recovery volume of the one or more recovery volumes associated with the selected log volume with data from an associated snapshot volume of the one or more snapshot volumes associated with the selected log volume.

BRIEF DESCRIPTION OF THE DRAWINGS

FIG. 3 illustrates a volume configuration table in accordance with an example implementation.

FIG. 4 illustrates the recovery mapping table, in accordance with an example implementation.

FIG. 6 illustrates a log status table, in accordance with an example implementation.

FIG. 8 illustrates log data in a log volume of a server, in accordance with an example implementation.

FIG. 14 illustrates a log status table, in accordance with an example implementation.

DETAILED DESCRIPTION

Figure 1:
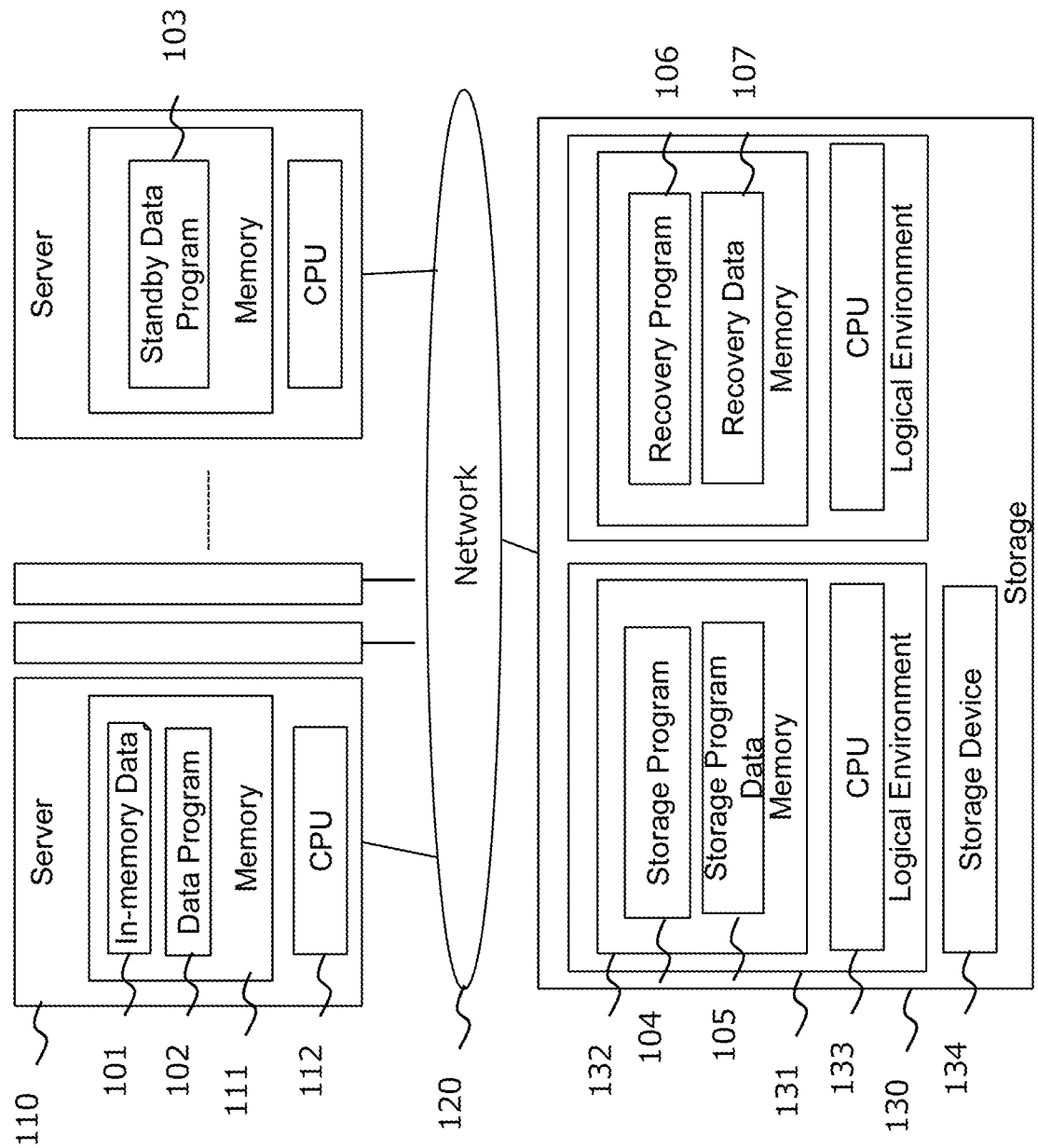
FIG. 1 illustrates the physical configuration of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations as described below, there is the creation of the recovery image within the shared storage.

FIG. 1 illustrates the physical configuration of the system, in accordance with an example implementation. Specifically, FIG. 1 illustrates an example of a physical configuration of the system in which the method and apparatus of example implementations may be applied. In the physical configuration of FIG. 1, there are a plurality of servers 110, which can include a central processing unit (CPU) 112, and memory 111. Memory 111 can be configured to store in-memory data 101 and data program 102. Data program 102 can include in-memory computing applications for middleware. Further, one or more standby data programs 103 can be stored in one or more servers 110 of the system. The servers 110 that are not functioning as the standby computer thereby conduct data processing through data program 102 and store the most recently processed data (e.g., "most recent data") as in-memory data. Examples of most recently processed data can include the primary data indicated by an in-memory database that stores and updates in the memory 111.

The physical configuration can also include one or more networks 120 connecting between each of the servers 110 or between servers 110 and storage system 130. The one or more storage systems can include CPU 133, memory 132, one or more storage devices 134, and a plurality of logical environments 130. The one or more storage devices 134 can include devices such as hard disk drives (HDD), solid state drives (SSD), and flash storage. Each of the logical environments 130 can include logical partitions, virtual machines, and containers and can also manage storage program 104 and storage program data 105 in memory 132.

Figure 7:
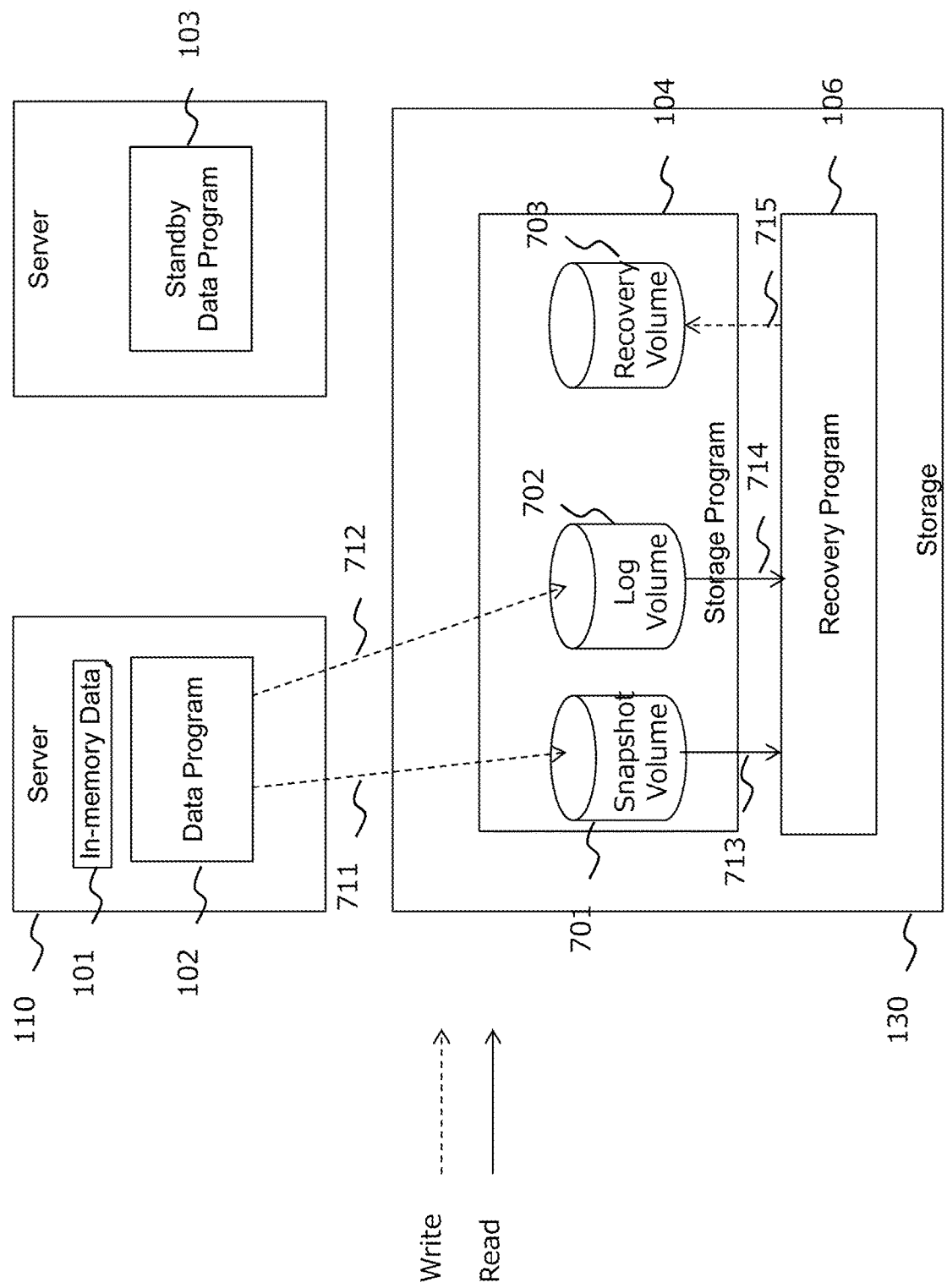
FIG. 7 illustrates the logical configuration of the system, in accordance with an example implementation.

Storage system 130 is configured to provide a snapshot volume for each server 110 connected to the storage system 130, so that each server is associated with a snapshot volume. Further, storage system 130 may also provide an associated recovery volume for the snapshot volume as well as an associated log volume. Storage system 130 can manage a log volume, a snapshot volume and a recovery volume for each server configured to store the most recently processed data. Snapshot volume, recovery volume and log volume can be provided logically to the associated server through the one or more storage devices 134 as illustrated in FIG. 7. The memory 132 of the storage system can also store the information associating the snapshot volumes to the corresponding recovery volumes and log volumes as illustrated, for example, in FIGS. 3, 4 and 6.

Figure 2:
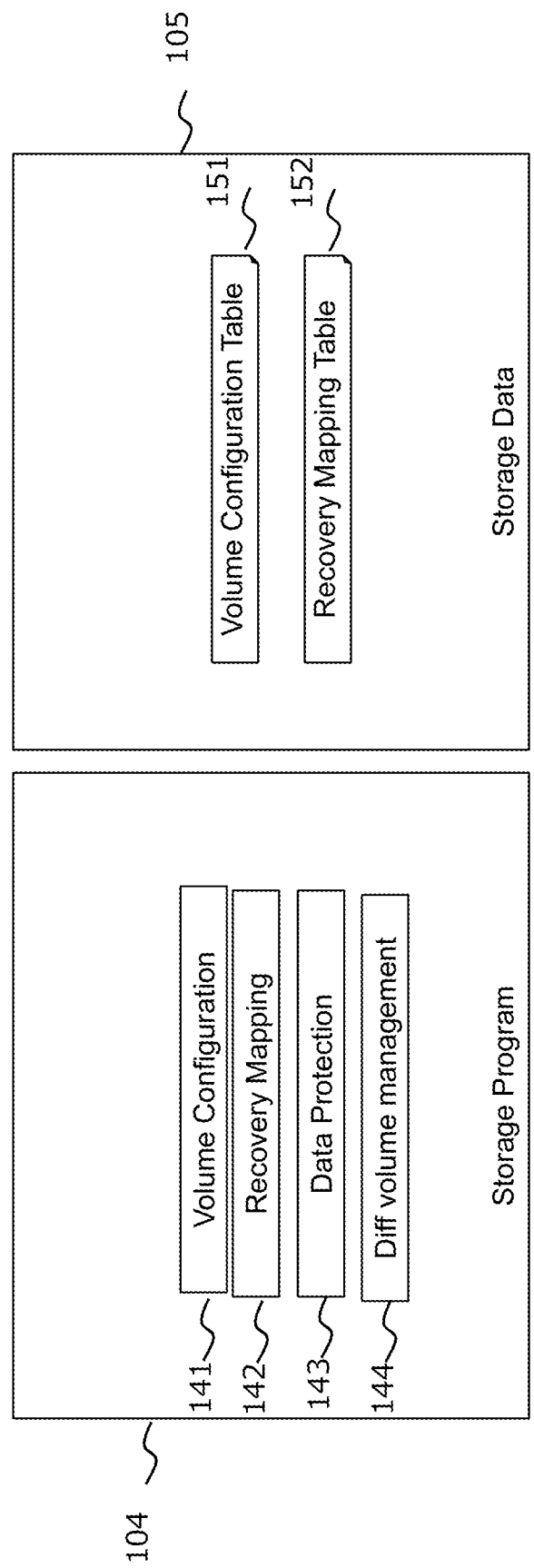
FIG. 2 illustrates a configuration of storage program, in accordance with an example implementation.

FIG. 2 illustrates a configuration of storage program, in accordance with an example implementation. Specifically, FIG. 2 illustrates a configuration of storage program 104 and storage data 105. Storage program 104 can include volume configuration 141, recovery mapping 142, data protection 143, and differential volume management 144. Volume Configuration 141 is a function module that creates and provides accessible storage volumes from servers using the storage devices. Data protection 143 is a function module that provides data protection functions such as redundant array of inexpensive disks (RAID), erasure coding, encryption, snapshot, replication, and so on. Offloading Mapping 142 is a function module to get host-side volume utility information and manage a volume for recovery. Differential Volume Management 144 is a function module that provides for the creation of difference image volumes from the master volume with updated data segment management. Storage data 105 includes Volume Configuration Table 151 and Recovery Mapping Table 152.

FIG. 3 illustrates a volume configuration table in accordance with an example implementation. Specifically, FIG. 3 illustrates Volume Configuration Table 151. Column 1511 illustrates the volume ID (identification). Column 1512 illustrates the Host ID that is allowed access the corresponding volume ID. This information includes both the server and the logical environment in storage. For example, "Sv1" is the ID for the server that runs Data Program, "Recovery1" is the ID for the logical environment that runs the Recovery Program. Accordingly, both the server and the logical environment can access the volume that has the ID of "1". Column 1513 illustrates the Host Volume ID that is recognized by the host. Column 1514 illustrates the storage capacity of the volume. Column 1515 illustrates the storage devices utilized for the volume. Column 1516 illustrates the data protection mode, such as the RAID mode. Column 1517 illustrates the differential volume information. If this value is not "N/A", this volume is a difference image volume. In this case, this volume shows the master volume ID. Thus, CPU 133 can create recovery volumes as a difference volume between snapshot volumes as new snapshots are taken (e.g., between the present snapshot volume and the older version of the snapshot volume), which can be managed in this table as well as in FIG. 4.

FIG. 4 illustrates the recovery mapping table 152, in accordance with an example implementation. Column 1521 illustrates the Host ID. Column 1522 illustrates the associated volume ID. Column 1523 illustrates the purpose of the volume for the host. Column 1524 illustrates the associated Recovery Volume ID that stores the recovery image.

Figure 5:
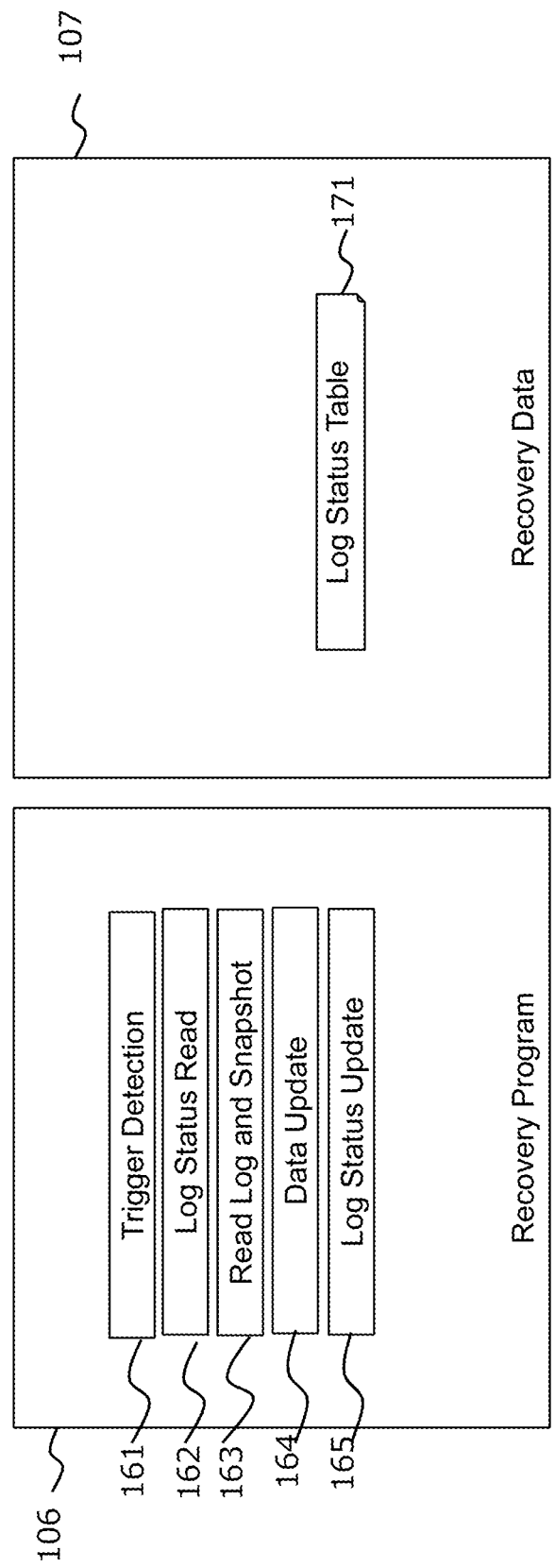
FIG. 5 illustrates a configuration of a recovery program and recovery data, in accordance with an example implementation.

FIG. 5 illustrates a configuration of a recovery program and recovery data, in accordance with an example implementation. Specifically, FIG. 5 illustrates a configuration of Recovery Program 106 and a Recovery Data 107. The Recovery Program 106 can include Trigger Detection 161, Log Status Read 162, Read Log and Snapshot 163, Data Update 164 and Log Status Update 165. More details about the functions of the Recovery Program 106 are provided with respect to FIG. 10. Recovery data 107 includes Log Status Table 171, which is described with respect to FIG. 6 below.

FIG. 6 illustrates a log status table, in accordance with an example implementation. Specifically, Column 1711 illustrates the Host ID, column 1712 illustrates the Log Volume ID identifying the log volume associated with the host corresponding to the Host ID, column 1713 illustrates the name or ID of the associated data program, and column 1714 illustrates the associated Applied Log ID. The Applied Log ID is an identifier for what log data has already been applied to the recovery image of the recovery volume. In the example as illustrated in FIG. 6, the ID of the log data is serialized, so the number logs up to the applied log ID can be estimated, as well as allowing the storage system to know what log IDs have not been applied to the recovery image.

FIG. 7 illustrates the logical configuration of the system, in accordance with an example implementation. Specifically, FIG. 7 illustrates the logical configuration of the system when the system is in the operation phase. In the example as illustrated in FIG. 7, the Storage Program 104 provides three types of volumes for the data program 102, which is the snapshot volume 701, the log volume 702 and the recovery volume 703. The recovery program 106 is configured to access the volumes to create a recovery image. The relationship between programs and volumes are illustrated in FIG. 7, with write access illustrated with dashed line arrows and read access illustrated by solid line arrows. The dashed line arrow 711 illustrates that Data Program 102 writes the snapshot image into the Snapshot Volume 701 (e.g. periodically, constantly), and dashed line arrow 712 illustrates that Data Program 102 also writes log data into Log Volume 702. Solid line arrows 713 and 714 illustrate that the Recovery Program 106 reads the Snapshot image from the Snapshot Volume 701 and the Log Volume 702. Dashed line arrow 715 illustrates that the Recovery Program 106 writes a recovery image into the Recovery Volume 703, which is created by applying the log data to the snapshot image.

FIG. 8 illustrates log data in a log volume of a server, in accordance with an example implementation. Specifically, Column 801 illustrates the Log ID. Column 802 illustrates the associated transaction ID. Column 803 illustrates the associated object to which data in the recovery volume is updated. Column 804 illustrates the associated value before and after the data update, which is indicative of the value updated in the recovery volume specified by the associated object. Column 805 illustrates the associated commit flag, which indicates whether the log has been applied. If the commit flag is set, the corresponding log ID has already been committed in a snapshot image of the server stored in the Snapshot Volume.

Figure 9:
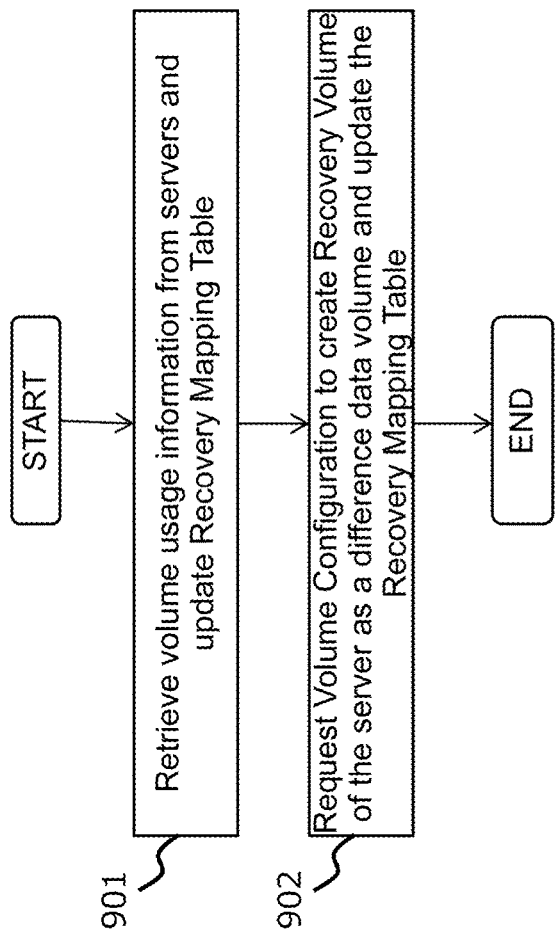
FIG. 9 illustrates the flow diagram of the recovery mapping, in accordance with an example implementation.

FIG. 9 illustrates the flow diagram of the recovery mapping, in accordance with an example implementation. Specifically, FIG. 9 illustrates the flow diagram of the recovery mapping module. The recovery mapping modules starts after the completion of a configuration process executed in the volume configuration, which can include the creation of volumes, the access configuration of the volumes and servers, and so on.

At 901, the recovery mapping module retrieves volume information from servers, and updates the recovery mapping table. The information indicates the purpose of the volume. In this example, the data program utilizes the volumes for snapshot and for log purposes, which is stored in the purpose column of the recovery mapping table as "Snapshot" or "Log".

At 902, the recovery mapping module requests the volume configuration module to create the recovery volumes of the servers as difference data volumes which is a replicated volume image of the Snapshot Volume of the corresponding server, and updates the Volume Configuration Table (Differential Volume Information) and the Recovery Mapping Table (Recovery Volume ID). In this step, the Volume Configuration module also enables access from Recovery Program to Recovery Volumes. Recovery Mapping Module stores the ID of the created Recovery Volumes in "Recovery Volume ID" of the Recovery Mapping Table.

Figure 10:
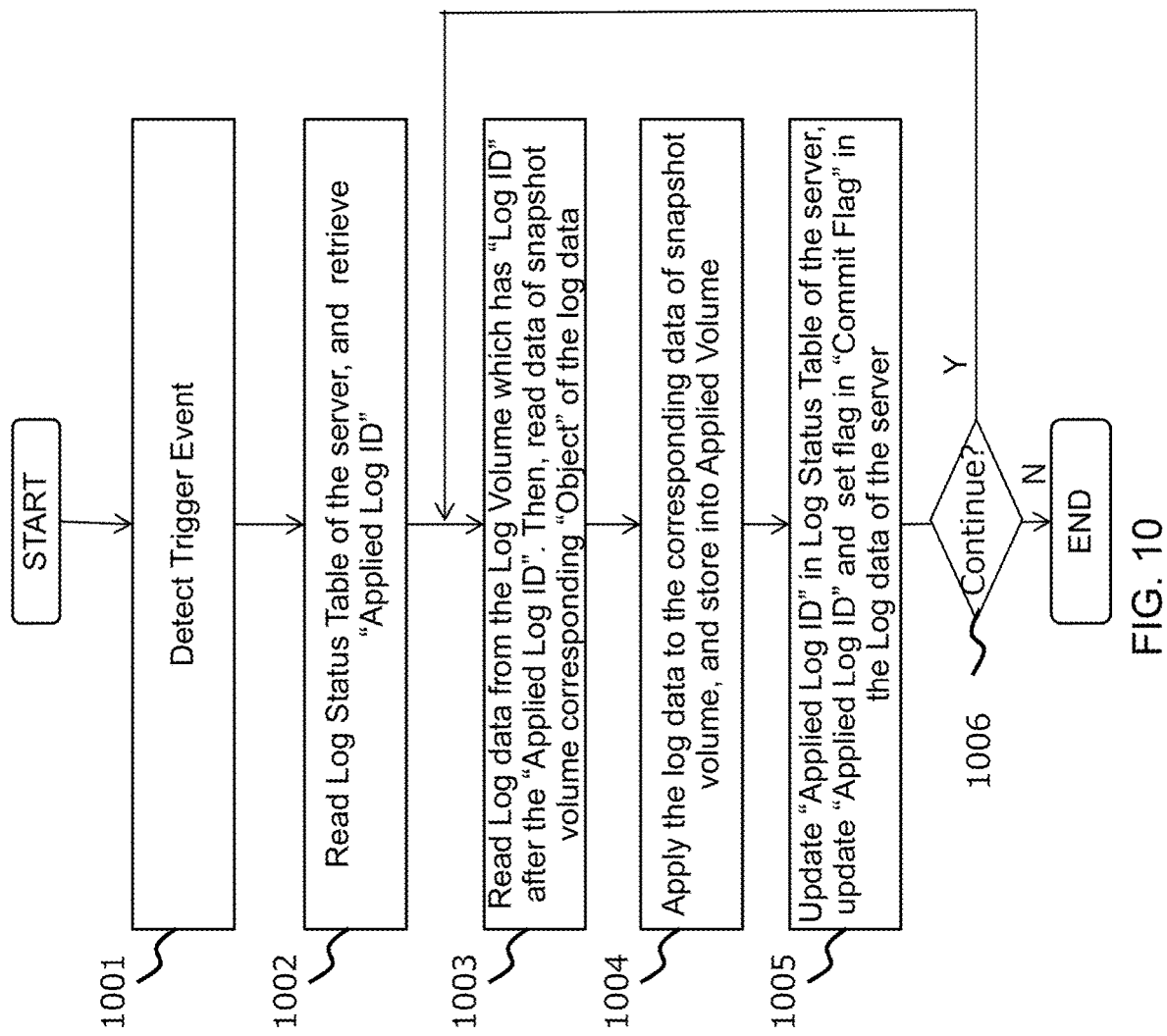
FIG. 10 illustrates the flow diagram of the recovery program, in accordance with an example implementation.

FIG. 10 illustrates the flow diagram of the recovery program, in accordance with an example implementation. This program can be executed continuously when one of the servers runs the Data Program. This program may be dedicated to one of the servers. In the example of FIG. 10, the storage system 130, through CPU 133 is configured to select the log volume based on an occurrence of a trigger event associated with a server, and process the selected log volume by applying the data transactions to the associated recovery volume that have not yet been applied as described below.

At 1001, the trigger detection module detects the trigger event. Examples of the trigger event are the log write from the server, the expiration of a specified time period, the condition of the storage system resources being below a threshold thereby indicating that resources are available for execution of the recovery program, an instruction to initiate the recovery program, and so on. In the example regarding storage system resources, as the recovery program may consume resources, the condition of the storage system resources can be such that the execution of the recovery program does not affect the storage process (e.g., workload is below some threshold). At 1002, the log status read module reads information from the log status table, and retrieves Applied Log ID information corresponding to the server. At 1003, the read log and the snapshot module reads log data from the log volume which has "Log ID" after the "Applied Log ID" is obtained from 1002. The Read Log and Snapshot module reads the data from the snapshot volume corresponding to the "Object" of the log data. At 1004, the data update module updates the value of the data snapshot volume by using the "Value after update" in the log data, and stores the data in the recovery volume. At 1005, the log status update module updates "Applied Log ID" from the Log Status Table as "Log ID" of the log data, and sets flag "x" in the "Commit Flag" of the log data. At 1006, the log status update module judges whether to go to the flow at 1003 or to proceed to the flow at 1001. In an example of a judgment condition, the log status update module can determine whether the latest Log ID of the log data is not the same as the Applied Log ID. If so (Y), then proceed to 1003, otherwise (N) proceed to 1001.

Figure 11:
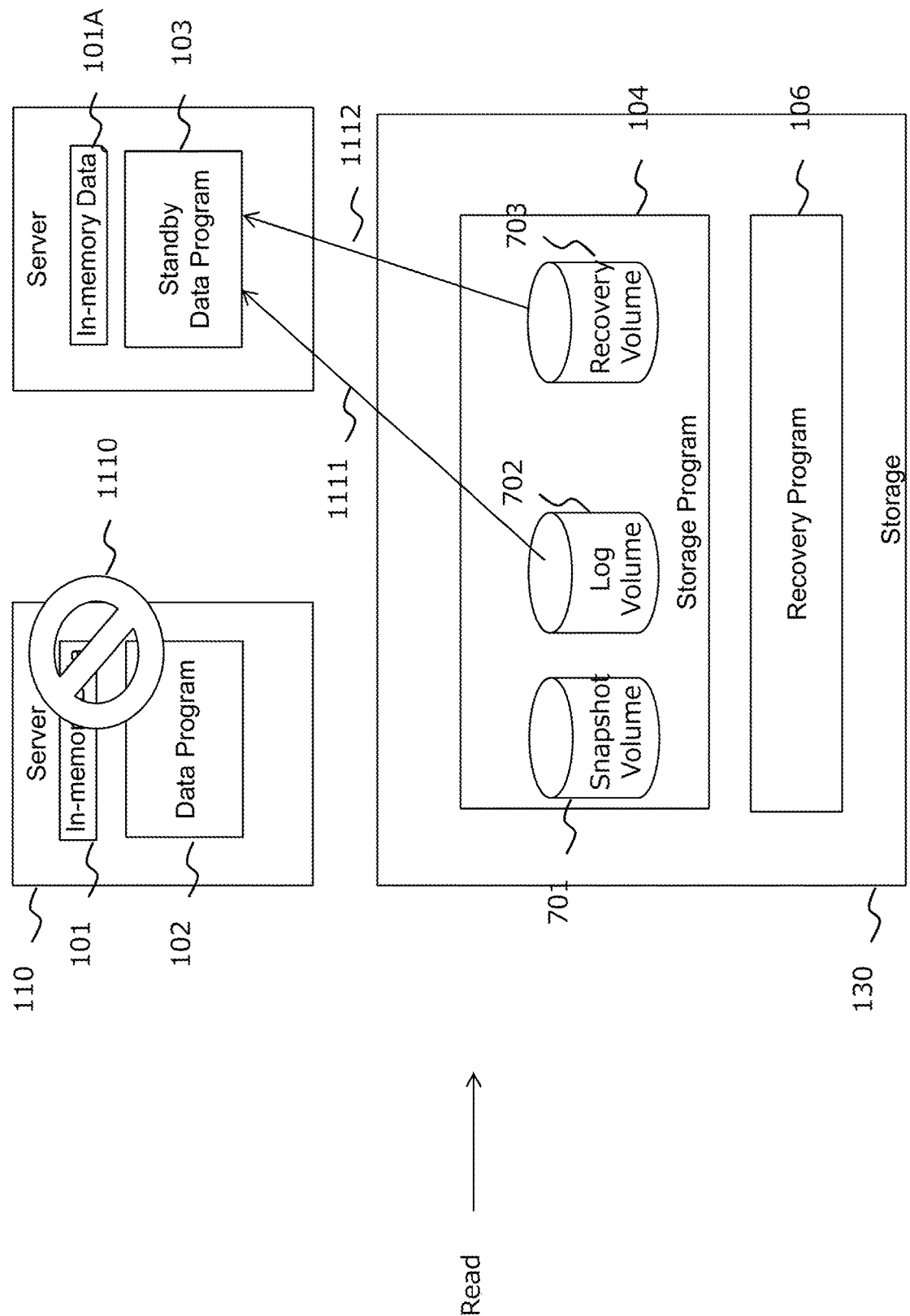
FIG. 11 illustrates the logical configuration of the system when the system is in recovery phase, in accordance with an example implementation.

FIG. 11 illustrates the logical configuration of the system when the system is in recovery phase, in accordance with an example implementation. Upon occurrence of a failure in one of the servers as shown at 1110, the Standby Data Program 103 executed by the CPU 133 automatically detects the failure and starts the recovery process to take over the data processing tasks from Data Program 102 to be handled by Standby Data Program 103. During this process, the Storage Program detects the start of the recovery process and swaps the Snapshot Volume 701 and Recovery Volume 703, so that Standby Data Program 103 can read the Recovery Volume 703 and load the data into a memory as In-memory Data 101A. The Standby Data Program 103 can utilize the information as illustrated, for example, in FIG. 4 to retrieve the corresponding Log Volume 702 associated with the failed server as shown at 1111, as well as the corresponding Snapshot Volume 701 associated with the failed server in the situation where there are multiple servers as shown at 1112. The Standby Data Program 103 loads data from the retrieved Recovery Volume 703 into the in-memory data 101A by reading the Log Volume 702 and processes the data processing transactions in the log of the Log Volume 702 that have not been committed. In this example implementation, the system can thereby reduce the number of logs that were not committed, which can also reduce the total recovery time.

In another example implementation, there are multiple recovery programs for each server in the system. Such example implementations also provide scheduling functions to optimize resource utilization of the storage for the recovery programs. In such an implementation, the memory 132 of the storage system is configured to store a recovery program for each of the one or more servers. The CPU 133 is thereby configured to process the selected log volume from the trigger event by executing the recovery program corresponding with the server of the selected log volume.

Figure 12:
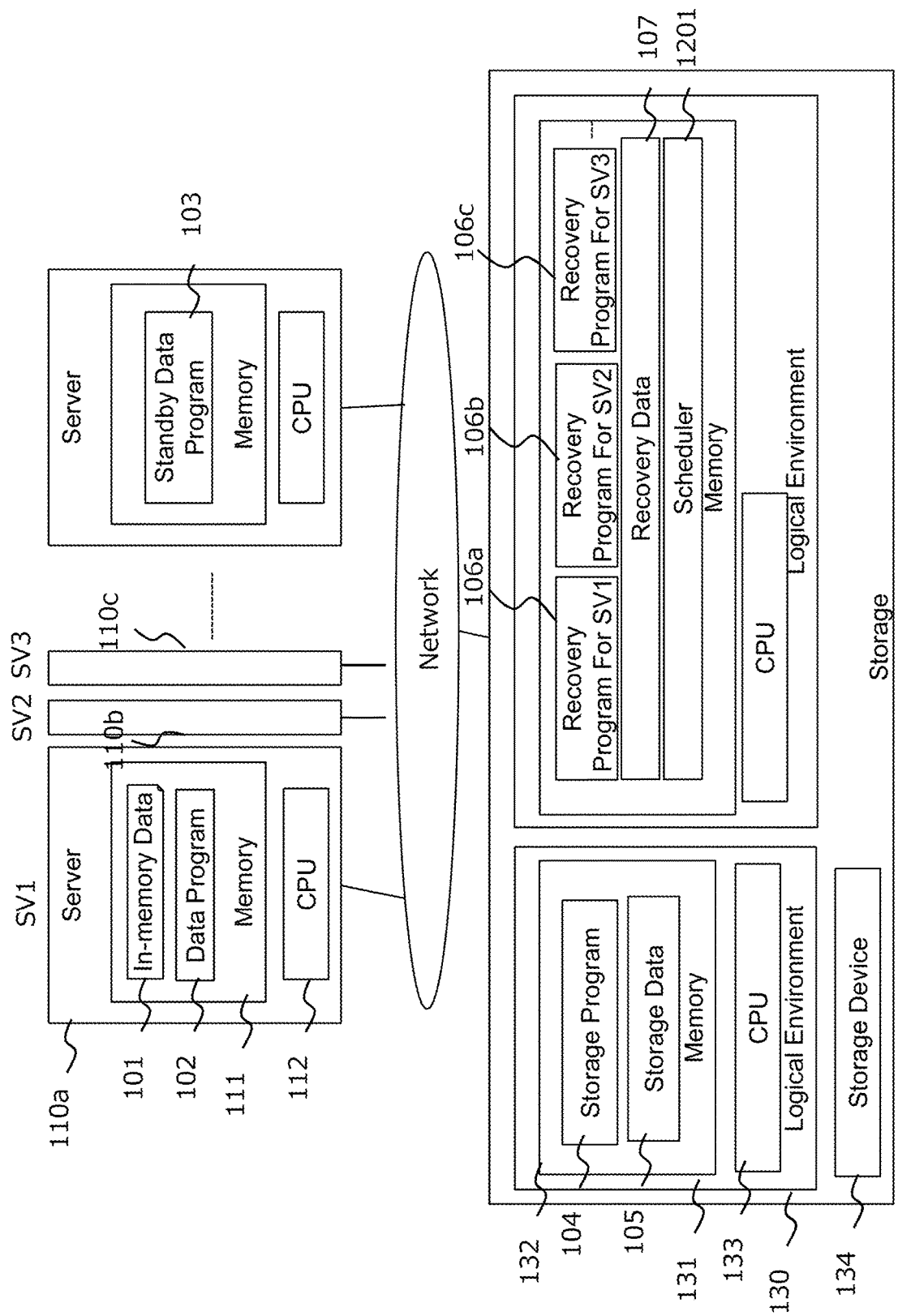
FIG. 12 illustrates the physical configuration of the system, upon which example implementations may be applied.

FIG. 12 illustrates the physical configuration of the system, upon which example implementations may be applied. In this example physical configuration of the system, the elements are the same as FIG. 1, with additions as noted below. There are multiple Recovery Programs and Schedulers 1201 in the storage system, to correspond with each of the servers. The Recovery Program for SV1 106a maps to server SV1 110a, the recovery program for SV2 106b maps to Server SV2 110b, the recovery program for SV3 106c maps to Server SV3 110c, and so on. Scheduler 1201 manages resource assignment for each of the recovery programs.

Figure 13:
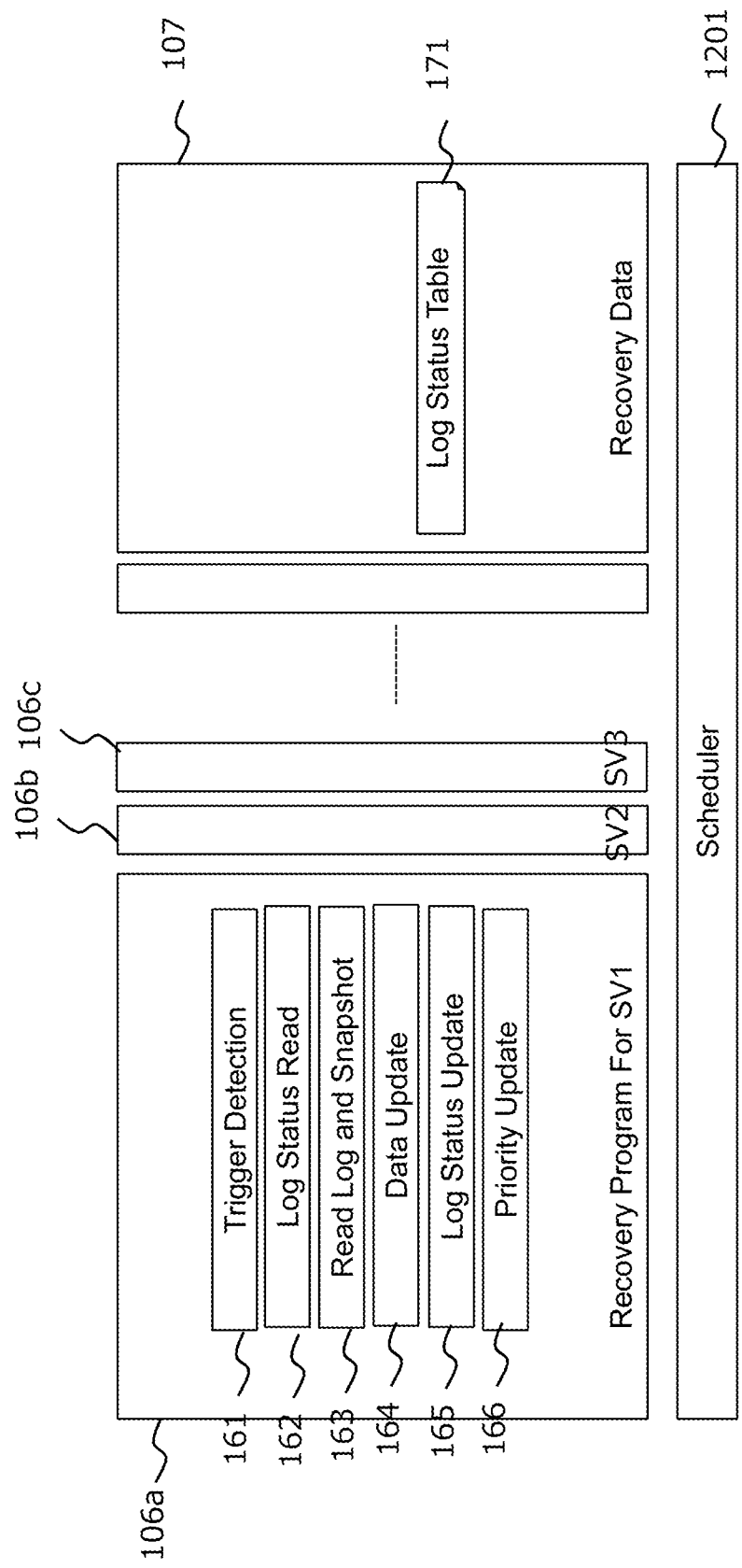
FIG. 13 illustrates the configuration of the recovery program and the recovery data, in accordance with an example implementation.

FIG. 13 illustrates the configuration of the recovery program and the recovery data, in accordance with an example implementation. In this example configuration of the recovery program and the recovery data, there is a Priority Update module 166 in each of the Recovery Programs and Schedulers 1201.

FIG. 14 illustrates a log status table, in accordance with an example implementation. In the example implementation of FIG. 14, there is a "Priority" column 1715. This column illustrates the priority of the data process in the servers. In the example of FIG. 14, this priority can be calculated by using the formula of: Priority=Latest Log ID of Log Volume−Applied Log, although other priority calculations can also be utilized (e.g. based on recency, server priority, server conditions) and the example implementations are not limited to this formula. The calculation is processed by Priority Update 166 module. Scheduler 1201 assigns the resource of the storage.

Figure 15:
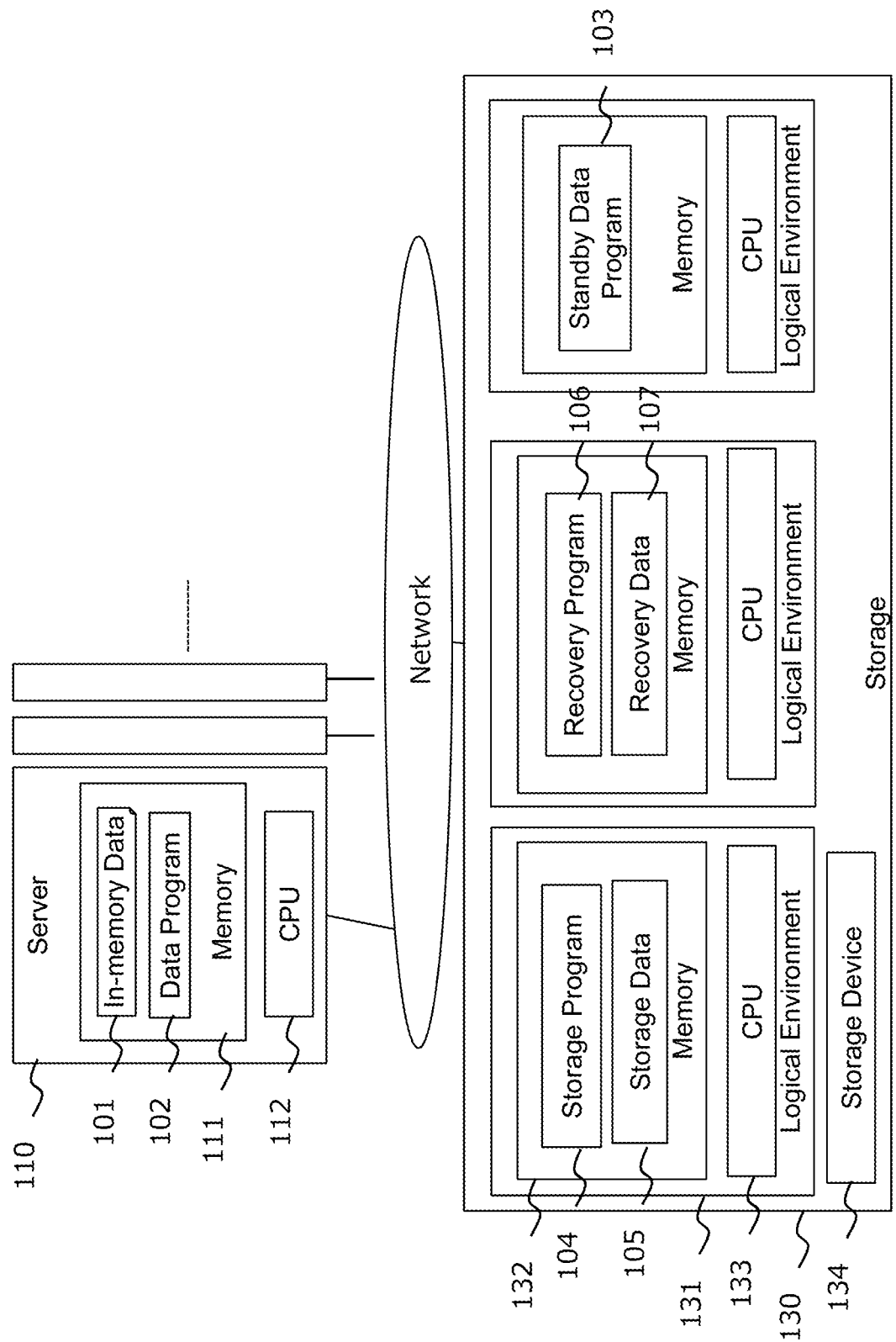
FIG. 15 illustrates an example of a physical configuration of the system in which example implementations may be applied.

In another example implementation, the Standby Data Program can be executed in the storage system as illustrated in FIG. 15. In this implementation, the hardware costs can be reduced by eliminating the need for a standby server, and the data loading time can be reduced between the Recovery Volume to a memory in the recovery process. In such an implementation, the memory 132 of the storage system 130 is configured to store a standby data program, and the one or more storage devices 134 are configured to provide capacity for storage of in-memory data. FIG. 15 illustrates an example of a physical configuration of the system in which example implementations may be applied. In the example implementation of FIG. 15, Standby Data Program 103 is stored in memory 132 of storage system 130.

Figure 16:
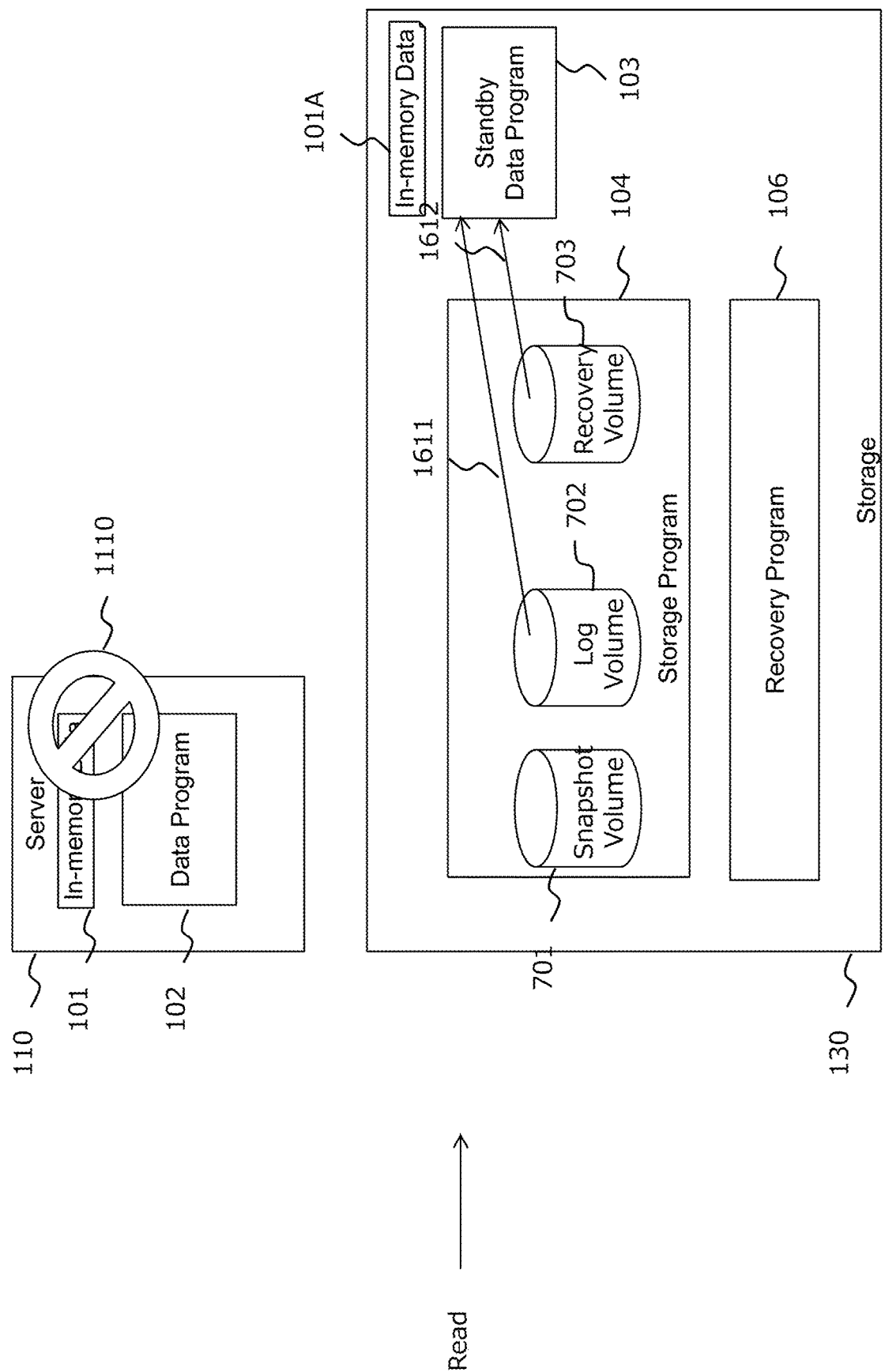
FIG. 16 illustrates the logical configuration of the system when the system is in recovery phase, in accordance with an example implementation.

FIG. 16 illustrates the logical configuration of the system when the system is in recovery phase, in accordance with an example implementation. Specifically, FIG. 16 illustrates the recovery phase when the Standby Data Program 103 is in the storage system 130. In the recovery process, the Standby Data Program 103 reads data from Recovery Volume 703 and Log Volume 702 internally as illustrated with arrows 1611 and 1612. In this implementation, the potential overhead and bottleneck for transmitting data over the network can be avoided.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A storage system configured to provide one or more snapshot volumes for one or more servers, each of the one or more servers configured to conduct data processing and store most recent data, the storage system comprising:
   one or more storage devices configured to provide the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers, each of the one or more recovery volumes created to be associated with the one or more snapshot volumes upon completion of a volume configuration process;
   a memory configured to store information associating the one or more snapshot volumes to the one or more recovery volumes, the information generated upon completion of the volume configuration process; and
   a processor, configured to:
      process selected log volume from the one or more log volumes to update an associated recovery volume of the one or more recovery volumes associated with the selected log volume with data from an associated snapshot volume of the one or more snapshot volumes associated with the selected log volume.

2. The storage system of claim 1, wherein the memory is configured to store a recovery program for each of the one or more servers, wherein the processor is configured to process the selected log volume by executing the recovery program associated with the associated server of the selected log volume.

3. The storage system of claim 1, wherein the memory is configured to store a standby data program and the one or more storage devices are configured to store in-memory data;
   for a failure of a server from the one or more servers, the processor is configured to execute the standby data program to:
      retrieve a log volume of the one or more log volumes associated with the failed server from the one or more servers, and a snapshot volume of the one or more snapshot volumes associated with the failed server from the one or more servers;
      load data from a recovery volume of the one or more recovery volumes associated with the failed server into the in-memory data of the one or more storage systems;
      read the log of the log volume associated with the failed server for the data processing transactions that are not committed; and
      update the in-memory data based on the data processing transactions that are not committed.

4. The storage system of claim 1, wherein the processor is configured to:
   select the log volume based on an occurrence of a trigger event associated with a server from the one or more servers; and
   process the selected log volume from the one or more log volumes by applying the data transactions that are not applied to the associated recovery volume, to the associated recovery volume.

5. The storage system of claim 4, wherein the trigger event comprises one or more of: a log write from a server of the one or more servers, an expiration of a time period, available resources meeting a threshold, and an instruction to initiate a recovery program.

6. The storage system of claim 1, wherein the processor is configured to:
   create the one or more recovery volumes as a difference volume between the associated snapshot volume and a prior associated snapshot volume.

7. A method for providing one or more snapshot volumes for one or more servers, each of the one or more servers configured to conduct data processing and store most recent data, the method comprising:
   providing, in a storage system, the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers, each of the one or more recovery volumes created to be associated with the one or more snapshot volumes upon completion of a volume configuration process;
   managing information associating the one or more snapshot volumes to the one or more recovery volumes, the information generated upon completion of the volume configuration process; and
   processing a selected log volume from the one or more log volumes to update an associate recovery volume of the one or more recovery volumes associated with the selected log volume with data from an associated snapshot volume of the one or more snapshot volumes associated with the selected log volume.

8. The method of claim 7, further comprising storing a recovery program for each of the one or more servers, and wherein the processing the selected log volume comprises executing the recovery program associated with the associated server of the selected log volume.

9. The method of claim 7, further comprising providing a standby data program and providing in-memory data in the storage system;
   for a failure of a server from the one or more servers, executing the standby data program to:

retrieve a log volume of the one or more log volumes associated with the failed server, and a snapshot volume of the one or more snapshot volumes associated with the failed server from the one or more servers;

load data from a recovery volume of the one or more recovery volumes associated with the failed server from the one or more servers into the in-memory data of the one or more storage systems;

read the log of the log volume associated with the failed server for the data processing transactions that are not committed; and update the in-memory data based on the data processing transactions that are not committed.

10. The method of claim 7, further comprising:

selecting the log volume based on an occurrence of a trigger event associated with a server from the one or more servers; and processing the selected log volume from the one or more log volumes by applying the data transactions that are not applied to the associated recovery volume, to the associated recovery volume.

11. The method of claim 10, wherein the trigger event comprises one or more of: a log write from a server of the one or more servers, an expiration of a time period, available resources meeting a threshold, and an instruction to initiate a recovery program.

12. The method of claim 7, further comprising creating the one or more recovery volumes as a difference volume between the associated snapshot volume and a prior associated snapshot volume.

13. A non-transitory computer readable medium, storing instructions for providing one or more snapshot volumes for one or more servers, each of the one or more servers configured to conduct data processing and store most recent data, the instructions comprising:

providing, in a storage system, the one or more snapshot volumes, one or more log volumes, and one or more recovery volumes, each of the one or more log volumes configured to store a log of data processing transactions of an associated server from the one or more servers, each of the one or more snapshot volumes configured to store a snapshot of the most recent data of an associated server of the one or more servers, each of the one or more recovery volumes created to be associated with the one or more snapshot volumes upon completion of a volume configuration;

managing information associating the one or more snapshot volumes to the one or more recovery volumes, the information generated upon completion of the volume configuration process; and processing a selected log volume from the one or more log volumes to update an associate recovery volume of the one or more recovery volumes associated with the selected log volume with data from an associated snapshot volume of the one or more snapshot volumes associated with the selected log volume.

14. The non-transitory computer readable medium of claim 13, the instructions further comprising storing a recovery program for each of the one or more servers, and wherein the processing the selected log volume comprises executing the recovery program associated with the associated server of the selected log volume.

15. The non-transitory computer readable medium of claim 13, wherein the storage system is configured to provide a standby data program and in-memory data, wherein the instructions further comprise:

for a failure of a server from the one or more servers, executing the standby data program to:

retrieve a log volume of the one or more log volumes associated with the failed server from the one or more servers, and a snapshot volume of the one or more snapshot volumes associated with the failed server from the one or more servers;

load data from a recovery volume of the one or more recovery volumes associated with the failed server into the in-memory data of the one or more storage systems;

read the log of the log volume associated with the failed server from the one or more servers for the data processing transactions that are not committed; and update the in-memory data based on the data processing transactions that are not committed.

* * * * *